United States Patent [19]

Nagata et al.

[11] Patent Number: 5,021,503
[45] Date of Patent: Jun. 4, 1991

[54] RESIN FOR PLASTIC LENS HAVING HIGH-REFRACTIVE INDEX, LENS COMPRISING THE RESIN, AND METHOD FOR PREPARATION OF THE LENS

[75] Inventors: Teruyuki Nagata; Koju Okazaki, both of Omuta; Nobuyuki Kajimoto, Yokohama; Tohru Miura, Yokohama; Yoshinobu Kanemura, Yokohama; Katsuyoshi Sasagawa, Yokohama, all of Japan

[73] Assignee: Mitsui Toatsu Chemicals, Inc., Tokyo, Japan

[21] Appl. No.: 311,352

[22] Filed: Feb. 15, 1989

[30] Foreign Application Priority Data

| Feb. 17, 1988 | [JP] | Japan | 63-32842 |
| Feb. 18, 1988 | [JP] | Japan | 63-33871 |
| Feb. 18, 1988 | [JP] | Japan | 63-33872 |
| Feb. 22, 1988 | [JP] | Japan | 63-37515 |
| Feb. 22, 1988 | [JP] | Japan | 63-37523 |
| Feb. 22, 1988 | [JP] | Japan | 63-37525 |

[51] Int. Cl.$^5$ ............................................ C08L 75/00
[52] U.S. Cl. .................................. 524/706; 524/714; 524/730; 524/731; 524/795; 528/76; 528/83; 528/85

[58] Field of Search ............................. 528/76, 83, 85; 524/706, 795, 714, 730, 731; 526/314

[56] References Cited

U.S. PATENT DOCUMENTS

| 4,086,211 | 4/1978 | Nakauchi et al. | 525/453 |
| 4,146,696 | 3/1979 | Bond et al. | 526/194 |
| 4,504,313 | 3/1985 | Robertson | 524/262 |
| 4,775,733 | 10/1988 | Kanemura et al. | 528/77 |
| 4,780,522 | 10/1988 | Kajimoto et al. | 528/85 |

Primary Examiner—Maurice J. Welsh
Attorney, Agent, or Firm—Burns, Doane, Swecker & Mathis

[57] ABSTRACT

The present invention relates to resin useful in preparing plastic lenses having a high refractive index comprising reacting an aliphatic polyisocyanate compounds having at least one sulfur atom with one or more of active hydrogen compounds selected from the group consisting of a polyol, a polythiol having sulfur atoms only in a mercapto groups, and a polythiol having at least one sulfur atom other than in the mercapto groups; lenses containing the above-mentioned resin; and a method for the preparation thereof characterized by adding an internal release agent to the mixture of the above-mentioned raw materials in casting lenses from the resin; and lenses obtained by this method.

19 Claims, No Drawings

RESIN FOR PLASTIC LENS HAVING HIGH-REFRACTIVE INDEX, LENS COMPRISING THE RESIN, AND METHOD FOR PREPARATION OF THE LENS

BACKGROUND OF THE INVENTION (1) Field of the Invention

The present invention relates to a resin useful in preparing plastic lenses having a high-refractive index, lenses containing the resin, and a method for the preparation of such lenses.

(2) Description of the Prior Art

In recent years, plastic lenses are rapidly being more frequently utilized as optical elements in eyeglasses, cameras and the like, because they are lighter, more unbreakable and more dyeable than inorganic lenses.

A resin which can be prepared by the radical polymerization of diethylene glycol bis(allyl carbonate) (hereinafter referred to simply as DAC) has been used to prepare such lenses. This resin has a high impact resistance, is lightweight, and exhibits excellent dyeing properties and good workability of cutting and polishing.

However, lenses prepared from the above-mentioned resin have a lower refractive index ($n_D=1.50$) than inorganic lenses ($n_D=1.52$). In order to obtain equivalent optical properties to glass lenses, it is necessary to increase the central thickness, peripheral thickness and curvature of the lens and hence the lens becomes very thick. For this reason, resins having a high-refractive index are desired. Resins which have been previously used to prepare lenses having a high-refractive index include resins prepared by reacting an isocyanate compound with diethylene glycol (U.S. Pat. No. 4,443,588), reacting an isocyanate compound with a hydroxyl compound containing a halogen atom such as tetrabromobisphenol A (Japanese Patent Laid-open Publication No. 164615/1983), or reacting an isocyanate compound with a hydroxyl compound containing a diphenyl sulfide skeleton (Japanese Patent Laid-open Publication No. 194401/1985).

The present inventors have previously proposed high-refractive plastic lenses comprising polyurethane resins or the like which can be prepared by reacting an isocyanate compound with a hydroxyl compound having a sulfur atom (U.S. Pat. Nos. 4,680,369 and 4,780,552) or reacting an isocyanate compound with a polythiol (U.S. Pat. No. 4,689,387 and Japanese Pat. Laid-open Publication No. 267316/1987).

Lenses comprising previously known resins have a higher-refractive index than the lenses containing DAC, however, the refractive index thereof is still insufficient. Such resins have drawbacks such as high dispersion, poor weatherability and great specific gravity, since the resins are made from compounds containing numerous halogen atoms or aromatic rings to improve the refractive index.

It has been known to add an internal releasing agent during the process for preparing such lenses to improve mold release characteristics. In such process butyl phosphate is added to DAC. However, the addition of butyl phosphate is not required, and results in impaired appearance of the molded articles. [Seiichi Mima, "Polymer Digest", 3, 39 (1984) and the like].

In molding polyurethane and S-alkyl thiocarbamic acid ester lenses, it is difficult to release the lens from the mold after polymerization. In order to solve this problem, the present inventors invented a method in which an external releasing agent is employed (Japanese Pat. Laid-open Publication No. 267316/1987) and a method in which a mold made from polyolefin resin is employed (Japanese Pat. Laid-open Publication No. 236818/1987).

However, these above mold release methods are still insufficient for improving mold release property in the cast polymerization because of the lens according to the present invention.

In the method in which an external releasing agent is employed, a surface treatment material for treating the inner surface of the mold is partially transferred to the surface and interior of the polymerized lenses, causing the lens surface to be uneven and turbid. The mold release treatment is required each time the mold is used. Accordingly, this method is intricate, decreases lens productivity, and thus is uneconomical.

Further, a polyolefin resin mold, is deformed at elevated temperatures, resulting in poor accuracy of the lens surfaces. Thus, the method cannot be applied in applications where high surface accuracy is required.

SUMMARY OF THE INVENTION

The present invention overcomes the problems and disadvantages of the prior art by providing a resin having improved properties over prior art resins, a process for producing the same, and a lens containing the resin having superior properties over prior art lenses, and a process for producing the lens.

An object of this invention is to provide a resin having excellent optical properties.

Another object of the invention is to provide a colorless and transparent resin having a high refractive index which is suitable for use in lenses.

It is also an object of the invention to provide a process for producing lenses efficiently and economically on an industrial scale.

It is a further object of the invention to provide plastic lenses having a high refractive index, high surface accuracy, excellent optical properties, excellent impact resistance, and which are lightweight and suitable for use in eyeglasses and cameras.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the invention provides a process for producing a resin comprising reacting (a) one or more of aliphatic polyisocyanate compounds having at least one sulfur atom with (b) one or more of active hydrogen compounds selected from the group consisting of polyol compounds, polythiol compounds having sulfur atoms only in mercapto groups, and a polythiol compound having at least one sulfur atom in addition to the sulfur atoms contained in the mercapto group.

The present invention also provides process for producing a lens containing the resin of the invention comprising forming a mixture of (a) one or more of aliphatic polyisocyanate compounds having at least one sulfur atom; (b) one or more of active hydrogen compounds selected from the group consisting of a polyol compound, a polythio compound having sulfur atoms only in mercapto groups, and a polythiol compound having at least one sulfur atom in addition to the sulfur atom in the mercapto groups and (c) at least one internal releasing agent; pouring the mixture into a mold and polymerizing the mixture to form said lens.

The resin of this invention has excellent optical properties, is colorless and has a high refractive index. The plastic lenses of the invention have high surface accuracy, excellent weatherability, exhibit excellent impact resistance and optical properties and can be manufactured extremely efficiently on an industrial scale by the use of a usual glass mold without any specific mold release treatment.

DESCRIPTION OF THE PREFERRED EMBODIMENT

Reference will now be made in detail to the present preferred embodiment of the invention.

Exemplary aliphatic polyisocyanate compounds containing at least one sulfur atom and suitable for use in the processes of the invention include noncyclic aliphatic polyisocyanate compounds containing sulfur atom such as thiodiethyl diisocyanate, thiodipropyl diisocyanate, thiodihexyl diisocyanate, dimethylsulfine diisocyanate, dithiodimethyl diisocyanate, dithiodiethyl diisocyanate and dithiodipropyl diisocyanate; an aliphatic isocyanate containing sulfur atom and an aromatic ring such as bis[(4-isocyanatomethyl)benzene] sulfide; a cyclic aliphatic isocyanate containing sulfur atom such as 1,4-dithian-2,5-diisocyanate; and an aliphatic isocyanate containing sulfur atom and a heterocyclic ring.

Halogen-substituted compounds such as chlorinesubstituted and bromine-substituted compounds of these polyisocyanates, biuret reaction products thereof, adduct reaction products of the polyisocyanates and trimethylolpropane, and dimerization and trimerization reaction products of the polyisocyanate compounds are also suitable for use in the process of the invention.

The polyisocyanate compounds may be used alone or in a mixture of two or more thereof.

Exemplary active hydrogen compounds suitable for use in the process of the invention include a polyol compound, a polythiol compound containing sulfur atoms only in mercapto groups, and a polythiol compound containing at least one sulfur atom in addition to the sulfur atom in mercapto groups.

Exemplary suitable polyol compounds include polyols such as ethylene glycol, diethylene glycol, propylene glycol, dipropylene glycol, butylene glycol, neopentyl glycol, glycerin, trimethylolethane, trimethylolpropane, butanetriol, 1,2-methyl glycoside, pentaerythritol, dipentaerythritol, tripentaerythritol, sorbitol, erythritol, threitol, ribitol, arabinitol, xylitol, allitol, mannitol, dorcitol, iditol, glycol, inositol, hexanetriol, triglycerol, diglycerol, triethylene glycol, polyethylene glycol, tris(2-hydroxyethyl) isocyanurate, cyclobutanediol, cyclopentanediol, cyclohexanediol, cycloheptanediol, cyclooctanediol, cyclohexanedimethanol, hydroxypropylcyclohexanol, tricyclo(5,2,1,0$^{2.6}$)decane dimethanol, bicyclo(4,3,0-)nonanediol, dicyclohexanediol, tricyclo(5,3,1,1-)dodecanediol, bicyclo(4,3,0)nonanedimethanol, tricyclo(5,3,1,1)dodecane diethanol, hydroxypropyltricyclo(5,3,1,1)dodecanol, spiro(3,4)octanediol, butyl cyclohexanediol, 1,1-bicyclohexylidenediol, cyclohexanetriol, maltitol, lactitol, dihydroxynaphthalene, trihydroxynaphthalene, tetrahydroxynaphthalene, dihydroxybenzene, benzenetriol, biphenyltetraol, pyrogallol, (hydroxynaphthyl)pyrogallol, trihydroxyphenanthrene, bisphenol A, bisphenol F, xylylene glycol, di(2-hydroxyethoxy)benzene, bisphenol A-bis-(2hydroxyethyl ether), tetrabromobisphenol A, tetrabromobisphenol A-bis(2-hydroxy ethyl ether), dibromoneopentyl glycol and epoxy resin; condensation reaction products of these polyols and organic polybasic acids such as oxalic acid, glutamic acid, adipic acid, acetic acid, propionic acid, cyclohexanecarboxylic acid, β-oxocyclohexanepropionic acid, dimer acid, phthalic acid, isophthalic acid, salicylic acid, 3-bromopropionic acid, 2-bromoglycolic acid, dicarboxycyclohexane, pyromellitic acid, butanetetracarboxylic acid and bromophthalic acid; addition reaction products of the above-mentioned polyols and alkylene oxides such as ethylene oxide and propylene oxide; and addition reaction products of alkylene polyamines and alkylene oxides such as ethylene oxide and propylene oxide.

Halogen-substituted compounds such as chlorinesubstituted and bromine-substituted compounds of these above polyol compounds are also suitable for use in the process of the invention.

Exemplary polythiol compounds having sulfur atoms only in the mercapto groups suitable for use in the processes of the invention include aliphatic polythiols such as methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, bicyclo(2,2,1-)hepta-exo-cis-2,3-dithiol, 1,1-bis(mercaptomethyl)cyclohexane, thiomalic acid bis(2-mercaptoethyl ester), 2,3-dimercaptosuccinic acid (2-mercaptoethyl ester), 2,3-dimercapto-1-propanol(2-mercapto acetate), 2,3-dimercapto-1-propanol(3-mercapto propionate), diethylene glycol bis(2-mercapto acetate), diethylene glycol bis(3-mercapto propionate), 1,2-dimercaptopropyl methyl ether, 2,3-dimercaptopropyl methyl ether, 2,2-bis(mercaptomethyl)-1,3-propanedithiol, bis(2-mercaptoethyl) ether, ethylene glycol bis(2-mercapto acetate), ethylene glycol bis(3-mercapto propionate), trimethylolpropanebis(2-mercapto acetate), trimethylolpropane bis(3-mercapto propionate), pentaerythritoltetrakis(2-mercapto acetate) and pentaerythritoltetrakis(3-mercapto propionate), and halogen-substituted compounds such as chlorinesubstituted and bromine-substituted compounds thereof; aromatic polythiols such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethyleneoxy)benzene, 1,3-bis(mercaptomethyleneoxy)benzene, 1,4-bis(mercaptomethyleneoxy)benzene, 1,2-bis(mercaptoethyleneoxy)benzene, 1,3-bis(mercaptoethyleneoxy)benzene, 1,4-bis(mercaptoethyleneoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethy)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethyleneoxy)benzene, 1,2,4-tris(mercaptomethyleneoxy)benzene, 1,3,5-tris(mercaptomethyleneoxy)benzene, 1,2,3-tris(mercaptoethyleneoxy)benzene, 1,2,4-tris(mercaptoethyleneoxy)-benzene, 1,3,5-tris(mercaptoethyleneoxy)benzene, 1,2,3,4-tetramercaptobenzene, 1,2,3,5-tetramercaptobenzene, 1,2,4,5-tetramercaptobenzene, 1,2,3,4-tetrakis(mercaptomethy)benzene, 1,2,3,5-tetrakis(mercaptomethyl)benzene, 1,2,4,5-tetrakis(mercaptomethyl)-benzene, 1,2,3,4-tetrakis(mercaptomethyl)benzene, 1,2,3,5-tetrakis(mercaptoethyl)benzene, 1,2,4,5-tetrakis(mercaptoethyl)benzene, 1,2,3,4-tetrakis(mercaptomethyleneoxy)benzene, 1,2,3,5-tetrakis(mercaptomethyleneoxy)benzene, 1,2,4,5-tetrakis(mercaptomethyleneoxy)benzene, 1,2,3,4-tetrakis(mercaptoethyleneoxy)benzene, 1,2,3,5-tetrakis(mercaptoethyleneoxy)benzene, 1,2,4,5-tetrakis(mercaptoethyleneoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,3-di(p-methoxyphenyl)-propane-2,2-dithiol, 1,3-diphenylpropane-2,2-dithiol, phenylmethane-1,1-dithiol and 2,4-di(p-mercaptophenyl)pentane; halogen-substituted aromatic polythiols, for example, chlorine-substituted and bromine-substituted compounds such as 2,5-dichlorobenzene1,3-dithiol, 1,3-di(p-chlorophenyl)propane-2,2-dithiol, 3,4,5-tribromo-1,2-dimercaptobenzene and 2,3,4,6-tetrachloro-1,5-bis(mercaptomethyl)benzene; polythiols each containing a heterocyclic ring such as 2-methylamino-4,6-dithiol-sym-triazine, 2-ethylamine-4,6-dithiol-sym-triazine, 2-amino-4,6-dithiol-sym-triazine, 2-morpholino-4,6-dithiolsym-triazine, 2-cyclohexylamino-4,6-dithiol-sym-triazine, 2-methoxy-4,6-dithiol-sym-triazine, 2-phenoxy-4,6-dithiolsym-triazine, 2-thiobenzeneoxy-4,6-dithiol-sym-triazine and 2-thiobutyloxy-4,6-dithiol-sym-triazine, and halogensubstituted compounds such as chlorine-substituted and bromine-substituted compounds thereof.

Exemplary polythiol compounds containing at least one sulfur atom in addition to the sulfur atom in mercapto groups include aromatic polythiols such as 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene, 1,2,4,5-tetrakis(mercaptoethylthio)benzene and their nucleus-alkylated compounds; aliphatic polythiols such as bis(mercaptomethyl) sulfide, bis(mercaptoethyl) sulfide, bis(mercaptopropyl) sulfide, bis(mercaptomethylthio)methane, bis(2-mercaptoethylthio)methane, bis(3-mercaptopropylthio)methane, 1,2-bis(mercaptomethylthio)ethane, 1,2-bis(mercaptoethylthio)ethane, 1,2-bis(3-mercaptopropylthio)ethane, 1,3-bis(mercaptomethylthio)propane, 1,3-bis(2-mercaptoethylthio)propane, 1,3-bis(3-mercaptopropylthio)propane, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl) sulfide, 2,5-dimercapto-1,4-dithiane, bis(mercaptomethyl) disulfide, bis(mercaptoethyl) disulfide, bis(mercaptopropyl) disulfide, and esters of these compounds and thioglycolic acid or mercaptopropionic acid, hydroxymethyl sulfide bis(2-mercapto acetate), hydroxymethyl sulfide bis(3-mercapto propionate) hydroxyethyl sulfide bis(2-mercapto acetate), hydroxyethyl sulfide bis(3-mercapto propionate), hydroxypropyl sulfide bis(2-mercapto acetate), hydroxypropyl sulfide bis(3-mercapto propionate), hydroxymethyl disulfide bis(2-mercapto acetate), hydroxymethyl disulfide bis(3-mercapto propionate), hydroxyethyl disulfide bis(2-mercapto acetate), hydroxyethyl disulfide bis(3-mercapto propionate), hydroxypropyl disulfide bis(2-mercapto acetate), hydroxypropyl disulfide bis(3-mercapto propionate), 2-mercapto ethyl ether bis(2-mercapto acetate), 2-mercapto ethyl ether bis(3-mercapto propionate), 1,4-dithian-2,5-diolbis(2-mercapto acetate), 1,4-dithian-2,5-diolbis(3-mercapto propionate), thiodiglycolic acid bis(2-mercapto ethyl ester), thiodipropionic acid bis(2-mercapto ethyl ester), 4,4-thiodibutylic acid bis(2-mercapto ethyl ester), dithiodiglycolic acid bis(2-mercapto ethyl ester), dithiodipropionic acid bis(2-mercapto ethyl ester), 4,4-dithiodibutylic acid bis(2-mercapto ethyl ester), thiodiglycolic acid bis(2,3-dimercapto propyl ester), thiodipropionic acid bis(2,3-dimercapto propyl ester), dithioglycolic acid bis(2,3-dimercapto propyl ester) and dithiopropionic acid bis(2,3-dimercapto propyl ester); and heterocyclic compounds such as 3,4-thiophenedithiol, bismuthiol and 2,5-dimercapto-1,3,4-thiadiazole.

Halogen-substituted compounds such as chlorinesubstituted and bromine-substituted compounds of the above polythiol compounds may also be employed. These active hydrogen compounds may be used alone or in a mixture of two or more thereof.

The molar ratio of the functional groups of the polyisocyanate compound to the functional groups of the active hydrogen compound is from about 0.5 to about 3.0, preferably from about 0.5 to about 1.5, i.e., NCO/-(OH+SH).

In the plastic lens of the present invention, a urethane resin or an S-alkyl thiocarbamic acid ester resin is used as a raw material. Therefore in the plastic lens a urethane bond is present between an isocyanate group and a hydroxyl group, or an S-alkyl thiocarbamic acid ester bond is present between the isocyanate group and the mercapto group. However, the plastic lens of the present case may contain an allophanate bond, a urea bond, a biuret bond or the like in addition to the above bond depending on the intended end use of the lens.

For example, the isocyanate group may be further reacted with the urethane bond or S-alkyl thiocarbamic acid ester bond so as to increase the crosslink density. In this case, the reaction temperature is set to 100° C. or more, and the isocyanate component is used in an excess amount. Alternatively, an amine or the like may be used to utilize the urea bond or biuret bond. When the isocyanate compound is reacted with a compound other than the hydroxyl compound or mercapto compound, attention must be paid to coloring.

Various additives may be added to the raw materials to achieve particular properties for end use and lens of the invention. Exemplary suitable additives include a chain extender, a crosslinking agent, a light stabilizer, an ultraviolet absorbent, an anti-oxidant, an oil-soluble dye and a filler.

For the purpose of adjusting the reaction rate to a desired level, a known reaction catalyst may be added which can be generally used in the manufacture of the polyurethane or S-alkyl thiocarbamic acid ester.

The plastic lens of the present invention can be prepared by cast polymerization. One or more of aliphatic polyisocyanate compounds containing sulfur atom; one or more of active hydrogen compounds and at least one internal releasing agent are mixed to form a mixture; the resulting mixture is casted into a mold, and then polymerization is carried out.

Exemplary suitable internal releasing agents useful in the present invention include fluorine containing nonionic surface active agents, silicon containing nonionic surface active agents, alkyl quaternary ammonium salts, acidic phosphates, liquid paraffins, waxes, higher fatty acids and metallic salts thereof, higher fatty esters, higher fatty alcohols, bisamides, polysiloxanes and aliphatic amine ethylene oxide adducts. They can be suitably selected in view of the combination of monomers, polymerization conditions, economy and ease of handling.

The internal releasing agents may be used alone or in a mixture of two or more thereof.

The fluorine containing nonionic surface active agents and the silicon containing nonionic surface active agents, which are used as the internal releasing agents in the present invention, are compounds each having a perfluoroalkyl group or a dimethylpolysiloxane group, a hydroxyalkyl group and a phosphoric ester group. Exemplary suitable fluorine containing nonionic surface active agents commercially available include Unidain TM : DS-401 and DS-403 (products of Daikin Kogyo Co., Ltd.), F-Top TM : EF122A, EF126 and EF301 (products of Shinakita Chemical Co., Ltd.). An exemplary silicon containing nonionic surface active agents is a trial product Q2-120A of Dow Chemical Co..

Exemplary suitable alkyl quaternary ammonium salts useful as the internal releasing agents in the present invention include as cationic surface active agents such as alkyl quaternary ammonium salts including halogen salts, phosphates and sulfates of alkyl quaternary ammonium. Typical exemplary chlorides thereof include trimethylacetylammonium chloride, trimethylstearylammonium chloride, dimethylethylcetylammonium chloride, triethyldodecylammonium chloride, trioctylmethylammonium chloride and diethylcyclohexyldodecylammonium chloride.

Exemplary suitable acidic phosphate compounds for use as the internal releasing agent in the present invention include isopropyl acid phosphate, diisopropyl acid phosphate, butyl acid phosphate, dibutyl acid phosphate, octyl acid phosphate, dioctyl acid phosphate, isodecyl acid phosphate, diisodecyl acid phosphate, tridecanol acid phosphate and bis(tridecanol acid) phosphate.

Exemplary suitable metallic salts of the higher fatty acids useful as the internal releasing agents in the present invention include zinc salts, calcium salts, magnesium salts, nickel salts, copper salts and other salts of stearic acid, oleic acid, octanoic acid, lauric acid, behenic acid and ricinoleic acid such as zinc stearate, zinc oleate, zinc palmitate, zinc laurate, calcium stearate, calcium oleate, calcium palmitate, calcium laurate, magnesium stearate, magnesium oleate, magnesium laurate, magnesium palmitate, nickel stearate, nickel oleate, nickel palmitate, nickel laurate, copper stearate, copper oleate, copper laurate and copper palmitate.

Exemplary suitable higher fatty esters useful as the internal releasing agent in the present invention include esters of higher fatty acids such as stearic acid, oleic acid, octanoic acid, lauric acid and rioinoleic acid and alcohols such as ethylene glycol, dihydroxypropane, dihydroxybutane, neopentyl glycol and dihydroxyhexane.

The amount of the internal releasing agent to be used, which may be used alone or in the form of a mixture two or more thereof, is from about 0.1 to about 10,000 ppm, preferably from about 1 to about 5,000 ppm based on the total weight of a monomer mixture.

When the amount of the internal releasing agent is less than 0.1 ppm, mold release characteristics are bad; when it is in excess of 10,000 ppm, the lenses are turbid, and each lens is prematurely separated from the mold during polymerization and the surface accuracy of the lenses deteriorates.

Polymerization is carried out at from about $-20°$ C. to about 200° C., preferably from about room temperature to about 150° C., more preferably from about 50° C. to about 120° C., in from 0.5 to 72 hours, depending upon the types of monomers and the mold releasing agent employed.

The polymerized lenses may be subjected to an annealing treatment, if necessary.

The plastic lenses of the present invention have high surface accuracy and excellent optical properties, are lightweight and excellent in impact resistance, and are suitable for optical element materials such as lenses of glasses and cameras.

Moreover, the plastic lenses of the present invention can be subjected to physical and chemical treatments such as surface abrasion treatment, antistatic treatment, hard coat treatment, non-reflective coat treatment, coloring treatment and dimming treatment for the prevention of reflection, enhancement of hardness, improvement of abrasion resistance and chemical resistance, prevention of turbidity, supply of fashionability, and the like.

Now, the present invention will be further described and clarified by the following examples and comparative examples which are intended to be purely exemplary of the invention. The performance tests of the resins and lenses, specifically the tests of refractive index, Abbe's number, weatherability, mold release characteristics and appearance were carried out by the following procedure:

Refractive index and Abbe's number: Measured at 20° C. by the use of a Pulflich refractometer.

Weatherability: A resin specimen was set on a weatherometer equipped with a sunshine carbon arc lamp, and after 200 hours had elapsed, the resin specimen was taken out therefrom. Afterward, the specimen was compared in tint with the resin for lens which had not been subjected to the test. Evaluation was made by the ranking of "not changed", "slightly yellowed" and "yellowed" denoted by "O", "Δ" and "X", respectively.

Mold release characteristics: When a polymerized lens was released from a mold without resistance, the mold release characteristics were denoted by "O", and when a part or all of the lens was not released therefrom, they were denoted by "X", by mean of driving in a Teflon wedge between the lens and the mold.

Appearance: It was evaluated by visual observation.

Example 1

18.4 g (0.09 mol) of dithiodiethyl diisocyanate were mixed with 8.0 g (0.06 mol) of 1,2,6-hexanetriol. The resulting mixture was poured into a mold composed of a glass mold and a gasket, the temperature was raised slowly from room temperature to 120° C. taking 28 hours to complete the polymerization. The thus obtained lens was colorless and excellent in weatherability, had a refractive index $n_D^{20}$ of 1.57, an Abbe's number $\nu_D^{20}$ of 44 and a specific gravity of 1.32.

Examples 2 to 18 and Comparative Examples 1 to 3

Following the procedure of Example 1, lenses were prepared in composition ratios shown in Table 1. The results of performance tests are set forth in Table 1.

Example 19

18.4 g (0.09 mol) of dithioethyl diisocyanate, 8.0 g (0.06 mol) of 1,2,6-hexanetriol and 0.03 g of isopropyl acid phosphate were mixed. The resulting mixture was poured into a mold composed of a glass mold and a gasket, and was gradually heated from room temperature to 120°C. taking 28 hours to complete the polymerization. After the polymerization, a lens was released from the mold with ease. The thus obtained lens was colorless and had good surface accuracy. Moreover, it had a refractive index $n_D^{20}$ of 1.57 and an Abbe's number $\nu_D^{20}$ of 44.

Examples 20 to 47

Following the procedure of Example 19, lenses were prepared in composition ratios shown in Table 2. The results of performance tests are set forth in Table 2.

Comparative Examples 4 to 27

Following the procedure of Example 19 with the exception that the undermentioned mold treatments were carried out, lenses were prepared in the composition ratios shown in Table 3. The results of performance tests are set forth in Table 3.

(1) No treatment .... A glass mold was used without any release treatment.
(2) External release treatment ...... External mold releasing agent YSR-6209 TM (product of Toshiba Silicon Co.) was applied and baked on the inner surface of a glass mold.
(3) Reuse of external release treatment ...... The glass mold obtained by the external release treatment was once employed for the polymerization and then used again without any further treatment.
(4) Use of PP mold ...... A polypropylene mold was prepared by injection molding and used in place of the glass mold without any surface treatment.

Other embodiments of the invention will be apparent to the skilled in the art from consideration of the specification and practice of the invention disclosed herein. It is intended that the specification and examples be considered as exemplary only, with a true scope and spirit of the invention being indicated by the following claims.

TABLE 1

| | Active Hydrogen Compound | Polyisocyanate | Refractive Index | Abbe's Number | Weathering Resistance | Appearance |
|---|---|---|---|---|---|---|
| Example 2 | Trimethylolpropane 0.06 mol | $(SCH_2CH_2CH_2NCO)_2$ 0.09 mol | 1.56 | 45 | O | Transparent |
| Example 3 | Trimethylolpropane 0.06 mol | $S(CH_2CH_2NCO)_2$ 0.09 mol | 1.55 | 46 | O | " |
| Example 4 | $C(CH_2OCCH_2CH_2SH)_4$ $\|\|$ $O$ 0.04 mol | $(SCH_2CH_2NCO)_2$ 0.08 mol | 1.60 | 40 | O | " |
| Example 5 | $C(CH_2OCCH_2CH_2SH)_4$ $\|\|$ $O$ 0.04 mol | $S(CH_2CH_2NCO)_2$ 0.08 mol | 1.59 | 41 | O | " |
| Example 6 | $C(CH_2OCCH_2SH)_4$ $\|\|$ $O$ 0.04 mol | $(SCH_2CH_2NCO)_2$ 0.08 mol | 1.61 | 39 | O | " |
| Example 7 | $C(CH_2OCCH_2SH)_4$ $\|\|$ $O$ 0.04 mol | $S(CH_2CH_2CH_2NCO)_2$ 0.08 mol | 1.59 | 42 | O | " |
| Example 8 | $C(CH_2SCH_2CH_2SH)_4$ 0.04 mol | $S(CH_2CH_2NCO)_2$ 0.08 mol | 1.66 | 36 | O | " |
| Example 9 | $S(CH_2CHCH_2SH)_2$ $\|$ $SH$ 0.04 mol | $S(CH_2CH_2NCO)_2$ 0.08 mol | 1.65 | 35 | O | Transparent |
| Example 10 | $S(CH_2CHCH_2SH)_2$ $\|$ $SH$ 0.04 mol | $(SCH_2CH_2NCO)_2$ 0.08 mol | 1.66 | 34 | O | " |
| Example 11 | $C(CH_2SCH_2CH_2SH)_4$ 0.04 mol | $(SCH_2CH_2NCO)_2$ 0.08 mol | 1.67 | 34 | O | " |

TABLE 1-continued

| | Active Hydrogen Compound | Polyisocyanate | Refractive Index | Abbe's Number | Weathering Resistance | Appearance |
|---|---|---|---|---|---|---|
| Example 12 | Trimethylolpropane 0.04 mol<br><br>$C(CH_2OCCH_2CH_2SH)_4$<br>$\parallel$<br>$O$<br>0.02 mol | $S(CH_2CH_2NCO)_2$ 0.10 mol | 1.57 | 43 | O | " |
| Example 13 | Ethylene glycol 0.02 mol<br>$C(CH_2SCH_2CH_2SH)_4$ 0.04 mol | $S(CH_2CH_2NCO)_2$ 0.10 mol | 1.62 | 37 | O | " |
| Example 14 | $C(CH_2OCCH_2CH_2SH)_4$<br>$\parallel$<br>$O$<br>0.02 mol<br><br>$S(CH_2CHCH_2SH)_2$<br>$\mid$<br>$SH$<br>0.02 mol | $(SCH_2CH_2NCO)_2$ 0.08 mol | 1.64 | 35 | O | " |
| Example 15 | Trimethylolpropane 0.04 mol<br>Diethylene glycol 0.02 mol | $(SCH_2CH_2NCO)_2$ 0.08 mol | 1.57 | 45 | O | Transparent |
| Example 16 | $C(CH_2OCCH_2CH_2SH)_4$<br>$\parallel$<br>$O$<br>0.02 mol<br><br>$C(CH_2OCCH_2SH)_4$<br>$\parallel$<br>$O$<br>0.02 mol | $(SCH_2CH_2NCO)_2$ 0.08 mol | 1.61 | 40 | O | " |
| Example 17 | $C(CH_2SCH_2CH_2SH)_4$ 0.02 mol<br><br>$S(CH_2CHCH_2SH)_2$<br>$\mid$<br>$SH$<br>0.02 mol | $(SCH_2CH_2NCO)_2$ 0.08 mol | 1.66 | 35 | O | " |
| Example 18 | $C(CH_2OCCH_2CH_2SH)_4$<br>$\parallel$<br>$O$<br>0.05 mol | $S(CH_2CH_2NCO)_2$ 0.05 mol<br>$(SCH_2CH_2NCO)_2$ 0.05 mol | 1.59 | 40 | O | " |
| Comp. Ex. 1 | 1,4-Butanediol 0.07 mol | 1,6-Hexamethylene diisocyanate 0.07 mol | 1.50 | 55 | O | " |
| Comp. Ex. 2 | 1,2,3-Trimercaptobenzene 0.033 mol | 1,6-Hexamethylene diisocyanate 0.05 mol | 1.66 | 27 | O | " |
| Comp. Ex. 3 | 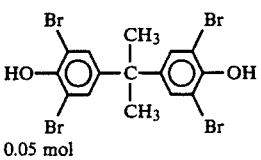<br>0.05 mol | 1,3-Xylylene diisocyanate 0.05 mol | 1.61 | 27 | Δ | Slightly yellowed |

TABLE 2

| | Polyisocyanate | Active Hydrogen Compound | Internal Releasing Agent | Release Characteristics | Appearance | Refractive Index | Abbe's Number |
|---|---|---|---|---|---|---|---|
| Example 20 | Dithiodipropyl diisocyanate 0.09 mol | Trimethylolpropane 0.06 mol | Unidain DS-403 200 ppm | O | High surface accuracy, Transparent | 1.56 | 45 |
| Example 21 | Thiodiethyl diisocyanate 0.09 mol | Trimethylolpropane 0.06 mol | F-Top EF-126 250 ppm | O | High surface accuracy, Transparent | 1.55 | 46 |
| Example 22 | Thiodiethyl | Trimethylolpropane | Q2-120A | O | High surface | 1.55 | 46 |

TABLE 2-continued

|  | Polyisocyanate | Active Hydrogen Compound | Internal Releasing Agent | Release Characteristics | Appearance | Refractive Index | Abbe's Number |
|---|---|---|---|---|---|---|---|
|  | diisocyanate 0.09 mol | 0.06 mol | 500 ppm |  | accuracy, Transparent |  |  |
| Example 23 | Dithiodiethyl diisocyanate 0.09 mol | Diethylene glycol 0.09 mol | Trioctylmethyl-ammonium chloride 500 ppm | O | High surface accuracy, Transparent | 1.57 | 45 |
| Example 24 | Dithiodiethyl diisocyanate 0.09 mol | Ethylene glycol 0.09 mol | Isopropyl acid phosphate 500 ppm | O | High surface accuracy, Transparent | 1.58 | 44 |
| Example 25 | (SCH$_2$CH$_2$NCO)$_2$ 0.08 mol | C(CH$_2$OCCH$_2$SH)$_4$ $\parallel$ O 0.04 mol | Unidain DS-401 (Daikin) 100 ppm | O | High surface accuracy, Transparent | 1.59 | 40 |
| Example 26 | (SCH$_2$CH$_2$NCO)$_2$ 0.08 mol | C(CH$_2$OCCH$_2$SH)$_4$ $\parallel$ O 0.04 mol | Q-2-120A (Dow) 150 ppm | O | High surface accuracy, Transparent | 1.61 | 39 |
| Example 27 | (SCH$_2$CH$_2$NCO)$_2$ 0.08 mol | C(CH$_2$OCCH$_2$SH)$_4$ $\parallel$ O 0.04 mol | Trimethylacetyl-ammonium chloride 500 ppm | O | High surface accuracy, Transparent | " | " |
| Example 28 | (SCH$_2$CH$_2$NCO)$_2$ 0.08 mol | C(CH$_2$OCCH$_2$SH)$_4$ $\parallel$ O 0.04 mol | Diisopropyl acid phosphate 500 ppm | O | High surface accuracy, Transparent | " | " |
| Example 29 | S(CH$_2$CH$_2$CH$_2$NCO)$_2$ 0.08 mol | C(CH$_2$OCCH$_2$SH)$_4$ $\parallel$ O 0.04 mol | Unidain DS-403 (Daikin) 100 ppm | O | High surface accuracy, Transparent | 1.59 | 42 |
| Example 30 | (SCH$_2$CH$_2$CH$_2$NCO)$_2$ 0.08 mol | C(CH$_2$OCCH$_2$SH)$_4$ $\parallel$ O 0.04 mol | Unidain DS-401 (Daikin) 100 ppm Q2-120A (Dow) 100 ppm | O | High surface accuracy, Transparent | 1.59 | 42 |
| Example 31 | (SCH$_2$CH$_2$NCO)$_2$ 0.08 mol | C(CH$_2$OCCH$_2$CH$_2$SH)$_4$ $\parallel$ O 0.04 mol | Dibutyl acid phosphate 500 ppm | O | High surface accuracy, Transparent | 1.59 | 39 |
| Example 32 | S(CH$_2$CH$_2$NCO)$_2$ 0.08 mol | C(CH$_2$OCCH$_2$CH$_2$SH)$_4$ $\parallel$ O 0.04 mol | Trimethyloctyl-ammonium chloride 500 ppm | O | High surface accuracy, Transparent | 1.58 | 41 |
| Example 33 | S(CH$_2$CH$_2$NCO)$_2$ 0.08 mol | C(CH$_2$SCH$_2$CH$_2$SH)$_4$ 0.04 mol | Unidain DS-401 (Daikin) 100 ppm | O | High surface accuracy, Transparent | 1.66 | 36 |
| Example 34 | (SCH$_2$CH$_2$NCO)$_2$ 0.08 mol | C(CH$_2$SCH$_2$CH$_2$SH)$_4$ 0.04 mol | Q2-120A (Dow) 150 ppm | O | High surface accuracy, Transparent | 1.66 | 36 |
| Example 35 | (SCH$_2$CH$_2$NCO)$_2$ 0.08 mol | C(CH$_2$SCH$_2$CH$_2$SH)$_4$ 0.04 mol | Trimethylacetyl-ammonium chloride 500 ppm | O | High surface accuracy, Transparent | " | " |
| Example 36 | (SCH$_2$CH$_2$NCO)$_2$ 0.08 mol | C(CH$_2$SCH$_2$CH$_2$SH)$_4$ 0.04 mol | Diisopropyl acid phosphate 500 ppm | O | High surface accuracy, Transparent | " | " |
| Example 37 | (SCH$_2$CH$_2$NCO)$_2$ 0.08 mol | C(CH$_2$SCH$_2$CH$_2$SH)$_4$ 0.04 mol | Unidain DS-403 (Daikin) 100 ppm | O | High surface accuracy, Transparent | 1.67 | 34 |
| Example 38 | (SCH$_2$CH$_2$NCO)$_2$ 0.08 mol | C(CH$_2$SCH$_2$CH$_2$SH)$_4$ 0.04 mol | Unidain DS-401 (Daikin) 100 ppm Q2-120A (Dow) 100 ppm | O | High surface accuracy, Transparent | 1.67 | 34 |
| Example 39 | (SCH$_2$CH$_2$NCO)$_2$ 0.08 mol | S(CH$_2$CHCH$_2$SH)$_2$ $\mid$ SH 0.04 mol | Dibutyl acid phosphate 500 ppm | O | High surface accuracy, Transparent | 1.66 | " |

TABLE 2-continued

|  | Polyisocyanate | Active Hydrogen Compound | Internal Releasing Agent | Release Characteristics | Appearance | Refractive Index | Abbe's Number |
|---|---|---|---|---|---|---|---|
| Example 40 | S(CH$_2$CH$_2$NCO)$_2$ 0.08 mol | S(CH$_2$CHCH$_2$SH)$_2$ \| SH 0.04 mol | Trimethyloctyl- ammonium chloride 500 ppm | O | High surface accuracy, Transparent | 1.65 | 35 |
| Example 41 | S(CH$_2$CH$_2$NCO)$_2$ 0.10 mol | Trimethylol propane 0.04 mol<br><br>C(CH$_2$OCCH$_2$CH$_2$SH)$_4$ \|\| O 0.02 mol | Unidain DS-403 200 ppm | O | High surface accuracy, Transparent | 1.57 | 43 |
| Example 42 | S(CH$_2$CH$_2$NCO)$_2$ 0.10 mol | Ethylene glycol 0.02 mol C(CH$_2$SCH$_2$CH$_2$SH)$_4$ 0.04 mol | Dibutyl acid phosphate 500 ppm | O | High surface accuracy, Transparent | 1.62 | 37 |
| Example 43 | (SCH$_2$CH$_2$NCO)$_2$ 0.08 mol | C(CH$_2$OCCH$_2$CH$_2$SH)$_4$ \|\| O 0.02 mol<br><br>S(CH$_2$CHCH$_2$SH)$_2$ \| SH 0.02 mol | Trimethyl octyl ammonium chloride 500 ppm | O | High surface accuracy, Transparent | 1.64 | 35 |
| Example 44 | (SCH$_2$CH$_2$NCO)$_2$ 0.08 mol | Trimethylol propane 0.04 mol Diethylene glycol 0.02 mol | Q2-120A (Dow) 500 ppm | O | High surface accuracy, Transparent | 1.57 | 45 |
| Example 45 | (SCH$_2$CH$_2$NCO)$_2$ 0.08 mol | C(CH$_2$OCCH$_2$CH$_2$SH)$_4$ \|\| O 0.02 mol<br><br>C(CH$_2$OCCH$_2$SH)$_4$ \|\| O 0.02 mol | Diisopropyl acid phosphate 500 ppm | O | High surface accuracy, Transparent | 1.61 | 40 |
| Example 46 | (SCH$_2$CH$_2$NCO)$_2$ 0.08 mol | C(CH$_2$SCH$_2$CH$_2$SH)$_4$ 0.02 mol<br><br>S(CH$_2$CHCH$_2$SH)$_2$ \| SH 0.02 mol | Diisopropyl acid phosphate 500 ppm | O | High surface accuracy, Transparent | 1.66 | 35 |
| Example 47 | S(CH$_2$CH$_2$NCO)$_2$ 0.05 mol (SCH$_2$CH$_2$NCO)$_2$ 0.05 mol | C(CH$_2$OCCH$_2$CH$_2$SH)$_4$ \|\| O 0.05 mol | Diisopropyl acid phosphate 500 ppm | O | High surface accuracy, Transparent | 1.59 | 40 |

TABLE 3

|  | Polyisocyanate | Active Hydrogen Compound | Mold Treatment | Release Characteristics | Appearance | Refractive Index | Abbe's Number |
|---|---|---|---|---|---|---|---|
| Comp. Ex. 4 | (SCH$_2$CH$_2$NCO)$_2$ 0.09 mol | 1,2,6-Hexanetriol 0.06 mol | No treatment | X | — | — | — |
| Comp. Ex. 5 | (SCH$_2$CH$_2$NCO)$_2$ 0.09 mol | 1,2,6-Hexanetriol 0.06 mol | External release treatment | O | Uneven surface, Transparent | 1.57 | 44 |
| Comp. Ex. 6 | (SCH$_2$CH$_2$NCO)$_2$ 0.09 mol | 1,2,6-Hexanetriol 0.06 mol | Reuse of external release treatment (mold used in Comp. Ex. 5) | X | — | — | — |
| Comp. Ex. 7 | (SCH$_2$CH$_2$NCO)$_2$ 0.09 mol | 1,2,6-Hexanetriol 0.06 mol | Use of PP mold | O | Bad surface accuracy, Transparent | 1.57 | 44 |
| Comp. Ex. 8 | S(CH$_2$CH$_2$NCO)$_2$ 0.09 mol | Trimethylol propane 0.06 mol | No treatment | X | — | — | — |
| Comp. Ex. 9 | S(CH$_2$CH$_2$NCO)$_2$ | Trimethylol propane | External | O | Uneven | 1.55 | 46 |

TABLE 3-continued

|  | Polyisocyanate | Active Hydrogen Compound | Mold Treatment | Release Characteristics | Appearance | Refractive Index | Abbe's Number |
|---|---|---|---|---|---|---|---|
|  | 0.09 mol | 0.06 mol | release treatment |  | surface, Transparent |  |  |
| Comp. Ex. 10 | $S(CH_2CH_2NCO)_2$ 0.09 mol | Trimethylol propane 0.06 mol | Reuse of external release treatment (mold used in Comp. Ex. 9) | X | — | — | — |
| Comp. Ex. 11 | $S(CH_2CH_2NCO)_2$ 0.09 mol | Trimethylol propane 0.06 mol | Use of PP mold | O | Bad surface accuracy, Transparent | 1.55 | 46 |
| Comp. Ex. 12 | $(SCH_2CH_2NCO)_2$ 0.08 mol | $C(CH_2OCCH_2SH)_4$ $\parallel$ $O$ 0.04 mol | No treatment | X | — | — | — |
| Comp. Ex. 13 | $(SCH_2CH_2NCO)_2$ 0.08 mol | $C(CH_2OCCH_2SH)_4$ $\parallel$ $O$ 0.04 mol | External release treatment | O | Uneven surface, Transparent | 1.61 | 39 |
| Comp. Ex. 14 | $(SCH_2CH_2NCO)_2$ 0.08 mol | $C(CH_2OCCH_2SH)_4$ $\parallel$ $O$ 0.04 mol | Reuse of external release treatment (mold used in Comp. Ex. 13) | X | — | — | — |
| Comp. Ex. 15 | $(SCH_2CH_2NCO)_2$ 0.08 mol | $C(CH_2OCCH_2SH)_4$ $\parallel$ $O$ 0.04 mol | Use of PP mold | O | Bad surface accuracy, Transparent | 1.61 | 39 |
| Comp. Ex. 16 | $S(CH_2CH_2CH_2NCO)_2$ 0.08 mol | $C(CH_2OCCH_2SH)_4$ $\parallel$ $O$ 0.04 mol | No treatment | X | — | — | — |
| Comp. Ex. 17 | $S(CH_2CH_2CH_2NCO)_2$ 0.08 mol | $C(CH_2OCCH_2SH)_4$ $\parallel$ $O$ 0.04 mol | External release treatment | O | Uneven surface, Transparent | 1.59 | 42 |
| Comp. Ex. 18 | $S(CH_2CH_2CH_2NCO)_2$ 0.08 mol | $C(CH_2OCCH_2SH)_4$ $\parallel$ $O$ 0.04 mol | Reuse of external release treatment (mold used in Comp. Ex. 17) | — | — | — | — |
| Comp. Ex. 19 | $(SCH_2CH_2NCO)_2$ 0.08 mol | $C(CH_2OCCH_2CH_2SH)_4$ $\parallel$ $O$ 0.04 mol | Use of PP mold | O | Bad surface accuracy, Transparent | 1.60 | 40 |
| Comp. Ex. 20 | $(SCH_2CH_2NCO)_2$ 0.08 mol | $C(CH_2SCH_2CH_2SH)_4$ 0.04 mol | No treatment | X | — | — | — |
| Comp. Ex. 21 | $(SCH_2CH_2NCO)_2$ 0.08 mol | $C(CH_2SCH_2CH_2SH)_4$ 0.04 mol | External release treatment | O | Uneven surface, Transparent | 1.66 | 36 |
| Comp. Ex. 22 | $(SCH_2CH_2NCO)_2$ 0.08 mol | $C(CH_2SCH_2CH_2SH)_4$ 0.04 mol | Reuse of external release treatment (mold used in Comp. Ex. 21) | X | — | — | — |
| Comp. Ex. 23 | $(SCH_2CH_2NCO)_2$ 0.08 mol | $C(CH_2SCH_2CH_2SH)_4$ 0.04 mol | Use of PP mold | O | Bad surface accuracy, Transparent | 1.66 | 36 |
| Comp. Ex. 24 | $S(CH_2CH_2NCO)_2$ 0.08 mol | $C(CH_2SCH_2CH_2SH)_4$ 0.04 mol | No treatment | X | — | — | — |
| Comp. Ex. 25 | $S(CH_2CH_2NCO)_2$ 0.08 mol | $C(CH_2SCH_2CH_2SH)_4$ 0.04 mol | External release treatment | O | Uneven surface, Transparent | 1.67 | 34 |
| Comp. Ex. 26 | $S(CH_2CH_2NCO)_2$ 0.08 mol | $C(CH_2SCH_2CH_2SH)_4$ 0.04 mol | Reuse of external release treatment (mold used in Comp. Ex. 25) | X | — | — | — |
| Comp. Ex. 27 |  | $S(CH_2CHCH_2SH)_2$ $\vert$ $SH$ 0.04 mol | Use of PP mold | O | Bad surface accuracy, Transparent | 1.66 | 34 |

What is claimed is:

1. A resin comprising the product of reacting one or more of sulfur-containing aliphatic polyisocyanate compounds with one or more active hydrogen compounds selected from the group consisting of polyol compounds and polythiol compounds.

2. A plastic lens comprising the resin of claim 1.

3. A process for producing a plastic lens comprising adding at least one internal mold releasing agent to a mixture of one or more sulfur-containing aliphatic polyisocyanate compounds and one or more active hydrogen compounds selected from the group consisting of polyol compounds and polythiol compounds followed by casting polymerization, wherein the proportion of the sulfur-containing aliphatic polyisocyanate compound to the active hydrogen compound is a mole ratio of from about 0.5 to about 3.0 moles of functional isocyanate group per mole of functional (SH+OH) group, and the internal mold releasing agent is present in an amount of from about 0.1 to about 10,000 ppm based on the total weight of the sulfur-containing aliphatic polyisocyanate compound and the active hydrogen compound.

4. A plastic lens produced by the process of claim 3.

5. The resin of claim 1 wherein the polythiol compounds are polythiol compounds having at least one sulfur atom in addition to the mercapto groups.

6. A plastic lens comprising the resin of claim 5.

7. The process of claim 3 wherein the polythiol compounds are polythiol compounds having at least one sulfur atom in addition to the mercapto groups.

8. A plastic lens produced by the process of claim 7.

9. The resin of claim 1 wherein the proportion of the sulfur-containing aliphatic polyisocyanate compound to the active hydrogen compound is a mole ratio of from about 0.5 to about 3.0 moles of functional isocyanate group per mole of functional (SH+OH) group.

10. A plastic lens comprising the resin of claim 9.

11. The process of claim 3 wherein the internal mold releasing agent is a fluorine containing nonionic surface active agent.

12. The process of claim 3 wherein the internal mold releasing agent is a silicon containing nonionic surface active agent.

13. The process of claim 3 wherein the internal mold releasing agent is an alkyl quaternary ammonium salt.

14. The process of claim 3 wherein the internal mold releasing agent is an acidic phosphate.

15. A plastic lens produced by the process of claim 11.

16. A plastic lens produced by the process of claim 12.

17. A plastic lens produced by the process of claim 13.

18. A plastic lens produced by the process of claim 18.

19. The process of claim 3 wherein the casting polymerization is carried out at a temperature of from about $-20°$ C. to about $200°$ C.

* * * * *

UNITED STATES PATENT AND TRADEMARK OFFICE
CERTIFICATE OF CORRECTION

PATENT NO. : 5,021,503
DATED : June 4, 1991
INVENTOR(S) : Nagata et al.

It is certified that error appears in the above-identified patent and that said Letters Patent is hereby corrected as shown below:

In Column 20, line 25, change "18" to --14--.

Signed and Sealed this

Sixth Day of April, 1993

*Attest:*

STEPHEN G. KUNIN

*Attesting Officer*     Acting Commissioner of Patents and Trademarks